United States Patent
Chang et al.

(10) Patent No.: US 8,275,032 B2
(45) Date of Patent: Sep. 25, 2012

(54) DISTRIBUTED VIDEO CODING APPARATUS AND METHOD CAPABLE OF CONTROLLING ENCODING RATE

(75) Inventors: June Young Chang, Daejeon (KR); Han Jin Cho, Daejeon (KR); Guee Sang Lee, Gwangju (KR); Young Hwan Bae, Daejeon (KR); In San Jeon, Daejeon (KR); Won Jong Kim, Daejeon (KR); Mi Young Lee, Daejeon (KR); Ju Yeob Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1133 days.

(21) Appl. No.: 12/142,708

(22) Filed: Jun. 19, 2008

(65) Prior Publication Data

US 2009/0147841 A1    Jun. 11, 2009

(30) Foreign Application Priority Data

Dec. 11, 2007  (KR) ......................... 10-2007-0128277

(51) Int. Cl.
*H04B 1/66* (2006.01)
(52) U.S. Cl. .................................. 375/240.01; 382/239
(58) Field of Classification Search ............. 375/240.01, 375/240.3, 240.26, 240.28; 382/239
See application file for complete search history.

(56) References Cited

U.S. PATENT DOCUMENTS

| | | | | |
|---|---|---|---|---|
| 5,543,853 A * | 8/1996 | Haskell et al. | ........... | 375/240.28 |
| 6,859,496 B1 * | 2/2005 | Boroczky et al. | ........ | 375/240.26 |
| 7,623,719 B2 * | 11/2009 | Molino et al. | ................. | 382/239 |
| 2008/0310505 A1 * | 12/2008 | Yan et al. | ................. | 375/240.03 |

OTHER PUBLICATIONS

Slepian et al., "Noiseless Coding of Correlated Information Sources", IEEE Transactions on Information Theory, vol. IT-19, No. 4, Jul. 1973, pp. 471-480.
Wyner et al., "The Rate-Distortion Function for Source Coding with Side Information at the Decoder", IEEE Transactions on Information Theory, vol. IT-22, No. 1, Jan. 1976, pp. 1-10.
Puri et al., "PRISM: A video Coding Architecture Based on Distributed Compression Principles", 40th Allerton Conference on Communication, Control and Computer, Allerton, IL, Oct. 1, 2002.
Girod et al., "Distributed Video Coding", Proc. IEEE, Special Issue on Advances in Video Coding and Delivery, pp. 1-12.
Rane, "Hash-Aided Motion Estimation and Rate Control for Distributed Video Coding", EE392J Project Report, Winter 2004, pp. 1-10.
Aaron et al., "VVyner-Ziv Video Coding with Hash-Based Motion Compensation at the Receiver", Information Systems Laboratory, Stanford University, Stanford, CA.
Brites et al., "Encoder Rate Control for Transform Domain Wyner-Ziv Video Coding", IEEE, ICIP 2007, pp. II-5-II-8.
Weerakkody et al., "Unidirectional Distributed Video Coding for Low Cost Video Encoding", IEEE Transactions on Consumer Electronics, vol. 53, No. 2, May 2007, pp. 788-795.

* cited by examiner

*Primary Examiner* — Michael Thier
*Assistant Examiner* — Vincelas Louis

(57) ABSTRACT

There are provided a distributed video coding apparatus and method capable of controlling an encoding rate, the apparatus including: an intra-frame encoder encoding a key frame and outputting a bit stream of the encoded key frame; an encoder rate control (ERC) module calculating a bit rate according to motion complexity of a present Wyner-Ziv (WZ) frame by using a correlation between the motion complexity and the bit rate; and a turbo encoder encoding the present WZ frame by the bit rate calculated at the ERC module and outputting the encoded WZ bit stream.

8 Claims, 3 Drawing Sheets

DISTRIBUTED VIDEO CODING APPARATUS AND METHOD CAPABLE OF CONTROLLING ENCODING RATE

CROSS-REFERENCE TO RELATED APPLICATIONS

This application claims the priority of Korean Patent Application No. 10-2007-0128277 filed on Dec. 11, 2007, in the Korean Intellectual Property Office, the disclosure of which is incorporated herein by reference.

BACKGROUND OF THE INVENTION

1. Field of the Invention

The present invention relates to a distributed video coding (DVC) apparatus and method capable of improving video coding performance, and more particularly, to a DVC apparatus and method having low complexity by controlling an encoding rate.

This work was supported by the IT R&D program of MIC/IITA [2005-S-077-03, titled: Development of On-chip Network-based SoC Platform].

2. Description of the Related Art

Nowadays, there are many applications related on video coding technology capable of accurately transmitting an image received from a camera. However, in applications using a wireless sensor network or small camera chips, terminals such as cameras and sensors have a limitation in processing abilities and the life span of batteries.

When encoding a large amount of image data received from a terminal, high compression rate is required to reduce data transmission costs, a small amount of calculation is required to maintain the life span of batteries, and encoding robust to a channel loss should be performed.

In response to requirements, there are provided Slepian-Wolf theory according to "Noiseless coding of correlated information sources (D. Slepian and J. Wolf, IEEE Transactions on Information Theory, vol. 19, pp. 471-480, July 1973.)" and distributed video coding (DVC) technique based on Wyner-Ziv theories according to "The rate-distortion function for source coding with side information at the decoder (A. D. Wyner and J. Ziv, IEEE Transactions on Information Theory, vol. 22, pp. 1-10, January 1976.)".

Such DVC technique is an image coding method to transfer complexity of encoders to decoders, in which lots of calculations of encoders may be transferred to decoders and it is possible to satisfy limitations in processing abilities and limited life span of batteries while maintaining identical rate-distortion.

To control a bit rate, most of coding methods using such DVC technique use feedback channels. When using feedback channels, to decode a Wyner-Ziv frame, it is required to perform many operations. Accordingly, use of feedback channels increases delays and complexity.

As coding methods using DVC technique, there is PRISM (Power-efficient, Robust, high-compression, Syndrome-based Multimedia coding) (refer to "PRISM: A video coding architecture based on distributed compression principles", R. Puri and K. Ramchandran, ERL Technical Report, pp. 93-102, March 2003.).

The PRISM is a coding method having low complexity and using distributed source coding, which is robust to errors and based on decoder movement estimation. According to experiments, the PRISM does not require feedback but provides very robust characteristics on errors. However, due to a limitation on performance and poor flexibility thereof, the PRISM has not been used in these days.

As another method, there is a method of Girod et al. using turbo codes (refer to "Distributed video coding", B. Girod, A. Aaron, S. Rane and D. R. Monedero, Proceedings of the IEEE, Special Issue on Video Coding and Delivery, pp. 71-88, January 2005.).

In the case of this method, an intra-frame is compressed in an encoder and an inter-frame is compressed in a decoder. Images are divided into key frames and Wyner-Ziv frames. Key frames are encoded using general intra-frame codecs, and Wyner-Ziv frames that are present between the key frames are encoded using intra-frame codecs and decoded using inter-frame decoding rather than intra-frame decoding. This method is based on Slepian-Wolf coder and uses a rate compatible punctured turbo code (RCPT).

In this case, a decoder generates side information using previously decoded key frames and Wyner-Ziv frames to decode each Wyner-Ziv frame. A turbo decoder decodes a Wyner-Ziv frame using the side information and transmitted parity bits.

There is currently provided a DVC method by research groups of Stanford University, (refer to "Wyner-Ziv video coding with hash-based motion compensation at the receiver", A. Aaron, S. Rane and B. Girod, Proceedings of IEEE International Conference on Image Processing, pp. 3097-3100, October 2004.). In the case of the method, an encoder generates and transmits additional information on present Wyner-Ziv frames in such a way that a decoder is capable of generating more accurate side information.

However, most of the described methods have fundamental defects caused by using feedback channels. That is, to decode a present Wyner-Ziv frame at a decoder, it is required to transmit corresponding information at an encoder. In this case, a feedback channel is generated in such a way that decoder is capable of obtaining parity bits from the encoder. Though it is possible to properly maintain a bit rate by using feedback channels, unnecessary delays occur and an amount of calculation performed at the decoder increases.

To improve this, it is required to reduce the number of feedbacks or remove feedback channels by controlling an encoding rate of Wyner-Ziv frames in coding methods using the DVC technique. The bit rate of Wyner-Ziv frames transferred from an encoder to a decoder is greatly affected by side information generated at the decoder. For example, as video quality of the side information of the decoder is excellent, a bit rate of Wyner-Ziv that should be sent by the encoder is reduced.

However, since the encoder is unaware of the side information generated at the decoder, a proper bit rate of Wyner-Ziv frames that should be sent to the decoder is unknown. There are provided several solutions related to this, as follows.

There is provided a method of calculating a bit rate of a decoder by previously rehearsing operation of a decode at an encoder in "Encoder Rate Control (ERC) for Transform Domain Wyner-Ziv Video Coding", (refer to C. Brites, F. Pereira, IEEE International Conference on Image Processing, San Antonio, Tex., USA, September 2007.). However, a considerable amount of calculation should be executed at the encoder.

In detail, an ERC module of the method considers that the operation of the decoder is executed using neighbor frames of an original Wyner-Ziv frame to estimate a required bit rate of the decoder. Accordingly, the ERC module calculates the required bit rate. At the encoder, to obtain side information, the bit rate may be applied to a module generating side information with low complexity.

Also, at the encoder, the bit rate may be obtained by calculating the entropy of the side information. Accordingly, in the case of this method, the required bit rate of the decoder may be well estimated but the amount of calculation executed at the encoder may be increased.

As another method, there is provided a system in "Unidirectional Distributed Video Coding for low cost video Encoding (W. A. R. J. Weerakkody, W. A. C. Fernando, IEEE Transactions on Consumer Electronics, Vol. 53, No. 2, pp. 788-795, 2007)". In the system, a user inputs a puncturing pattern to control a parity bit rate of an encoder. In this case, the encoder determines a parity puncturing pattern in bit rate control to remove feedback channels, by using blind technique. An input of a user determines a bit rate of each bit plane. At a first bit plane, ⅛ is sent. As a bit plane becomes higher, a parity bit rate gradually increases. Accordingly, as a bit plane becomes higher, a noise level of side information increases.

As described above, since conventional DVC methods use feedback channels, decoding is delayed and complexity of a decoder increases. To solve the problems, there are provided several methods. However, instead of solving the problems, an amount of calculation executed at an encoder increases to estimate a bit rate of the decoder, which is another problem.

SUMMARY OF THE INVENTION

An aspect of the present invention provides a coding apparatus and a coding method, in which, based on a correlation between a bit rate of a decoder, side information, and motion complexity, an encoder is capable of simply estimating the bit rate of the decoder by using motion complexity of a video image and controlling an encoding rate by using the bit rate, thereby reducing the number of feedbacks or perfectly removing feedback channels.

According to an aspect of the present invention, there is provided a distributed video coding apparatus capable of controlling an encoding rate, the apparatus including: an intra-frame encoder encoding a key frame and outputting a bit stream of the encoded key frame; an encoder rate control (ERC) module calculating a bit rate according to motion complexity of a present Wyner-Ziv (WZ) frame by using a correlation between the motion complexity and the bit rate; and a turbo encoder encoding the present WZ frame by the bit rate calculated at the ERC module and outputting the encoded WZ bit stream.

The apparatus may further include: a uniform quantizer uniformly quantizing the present WZ frame and providing the uniformly quantized WZ frame to the turbo encoder; and a buffer storing and outputting the WZ bit stream encoded at the turbo encoder, as a bit stream.

The turbo encoder may determine the number of parity bits according to the bit rate calculated at the ERC module.

The ERC module may obtain the motion complexity by using a difference between motions of the present WZ frame and the key frame and estimates the bit rate by multiplying the motion complexity by a constant k.

The constant k may be set according to target video quality of a decoder.

According to another aspect of the present invention, there is provided a distributed video coding method capable of controlling an encoding rate, the method including: obtaining a WZ frame and a key frame; calculating motion complexity by using the WZ frame and the key frame; estimating a bit rate of a WZ bit stream by using a linear correlation between the motion complexity and a bit rate; and encoding the WZ frame according to the estimated bit rate of the WZ bit stream.

The calculating motion complexity may include obtaining the complexity of the motion by calculating a difference between motions of a present WZ frame and a previous key frame by using the WZ frame and the key frame, as shown following Equation $$\beta_{2i} = \frac{1}{m \times n}\left(\sum_{k=1}^{m}\sum_{l=1}^{n}|I_{2i-1}(k,l) - X_{2i}(k,l)|\right)$$

wherein $\beta_{2i}$ indicates motion complexity of a WZ frame $X_2 i$, m×n indicates a size of an image, $I_{2i-1}$ indicates a key frame, $X_{2i}$ indicates a WZ frame, and (k, 1) indicates pixel coordinates.

The estimating a bit rate may include estimating the bit rate by multiplying the calculated motion complexity by a constant k.

The method may further include adjusting quality of an image that will be decoded, by changing the constant k according to target video quality.

According to an exemplary embodiment of the present invention, without increasing an amount of calculation executed at an encoder, a bit rate of a decoder may be simply estimated and control an encoding rate. Accordingly, feedback channels are removed or the number of feedbacks is reduced without increasing complexity of the encoder, thereby reducing decoding delays and complexity of the decoder.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
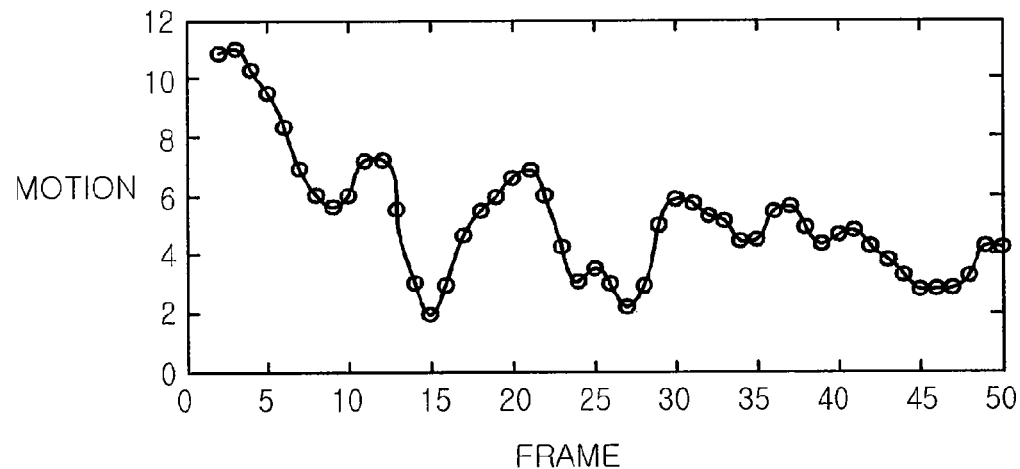
FIGS. 1A and 1B illustrate a correlation between motion complexity and a Wyner-Ziv (WZ) bit rate in a distributed video encoding apparatus having a function of encoder rate control, according to an exemplary embodiment of the present invention.

Hereinafter, exemplary embodiments of the present invention will now be described in detail with reference to the accompanying drawings.

Only, in describing operations of the exemplary embodiments in detail, when it is considered that a detailed description on related well-known functions or constitutions unnecessarily may make essential points of the present invention be unclear, the detailed description will be omitted. Also, in the drawings, the same reference numerals are used throughout to designate the same or similar components.

Also the term of "module" indicates a unit for processing a certain function or operation, which can be embodied by software, hardware, or a combination of software and hardware.

Before describing a distributed video coding (DVC) apparatus capable of controlling a bit rate, according to an exemplary embodiment of the present invention, referring to FIGS. 1A and 1B, there will be described a correlation between motion complexity of an image and a bit rate of a Wyner-Ziv (WZ) bit stream, which is used in the present embodiment.

To understand the correlation between the motion complexity of the image and the bit rate of the WZ bit stream, considering an interaction relation between side information generated at a decoder and motion complexity of an image, when a motion of an image is small and a motion of an object is easily estimated, that is, motion complexity of the image is low, video quality of side information is improved. In the opposite case, the video quality of the side information is deteriorated. Also, as the video quality of the side information is excellent, a bit rate of a smaller amount of WZ bit streams is required at the decoder. Accordingly, it may be known that the bit rate of the WZ bit stream is in proportion to the motion complexity of the image.

Accordingly, a bit rate required at the decoder may be estimated using the correlation between the motion complexity in the image and the bit rate of the WZ bit stream.

Figure 1B:
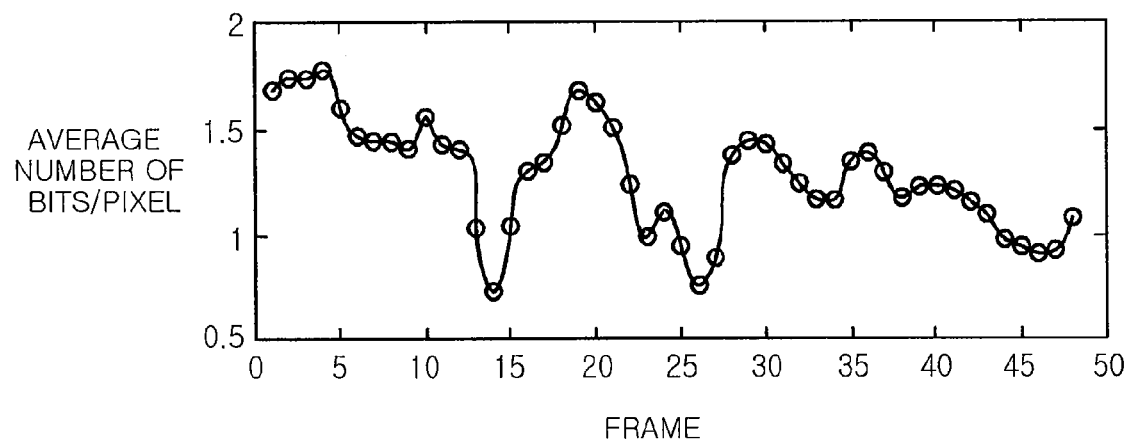

FIGS. 1A and 1B are graphs illustrating a correlation between motion complexity of an image and a bit rate.

Referring to FIG. 1A, there is shown a degree of a change of motion complexity estimated by a difference between movements of frames, in which 50 of frames of a Foreman image are used in experiments.

In this case, to estimate the motion complexity of the image, a difference between motions of two frames is used. A difference between motions of a previous frame and a present frame is obtained by using following Equation 1.

$$\beta_k = \frac{1}{m \times n} \sum_{i=1}^{m} \sum_{j=1}^{n} |P_{k-1}(i, j) - P_k(i, j)|  \quad \text{Equation (1)}$$

wherein $\beta_k$ indicates motion complexity obtained by a difference between motions of a previous frame and a present frame, m×n indicates a size of a frame, k indicates a present frame, k−1 indicates a previous frame, P(i, j) indicates a pixel value in a frame.

FIG. 1B is a graph illustrating a degree of a change of a bit rate for each frame, measured by applying the same frame as in FIG. 1A. Comparing FIG. 1A with FIG. 1B, degrees of changes of the motion complexity $\beta_k$ and the bit rates thereof are very similar to each other. Accordingly, it may be known that there is a correlation between motion complexity in an image and a WZ bit rate. The DVC apparatus controls an encoding rate by using the correlation between the motion complexity and the bit rate.

Figure 2:
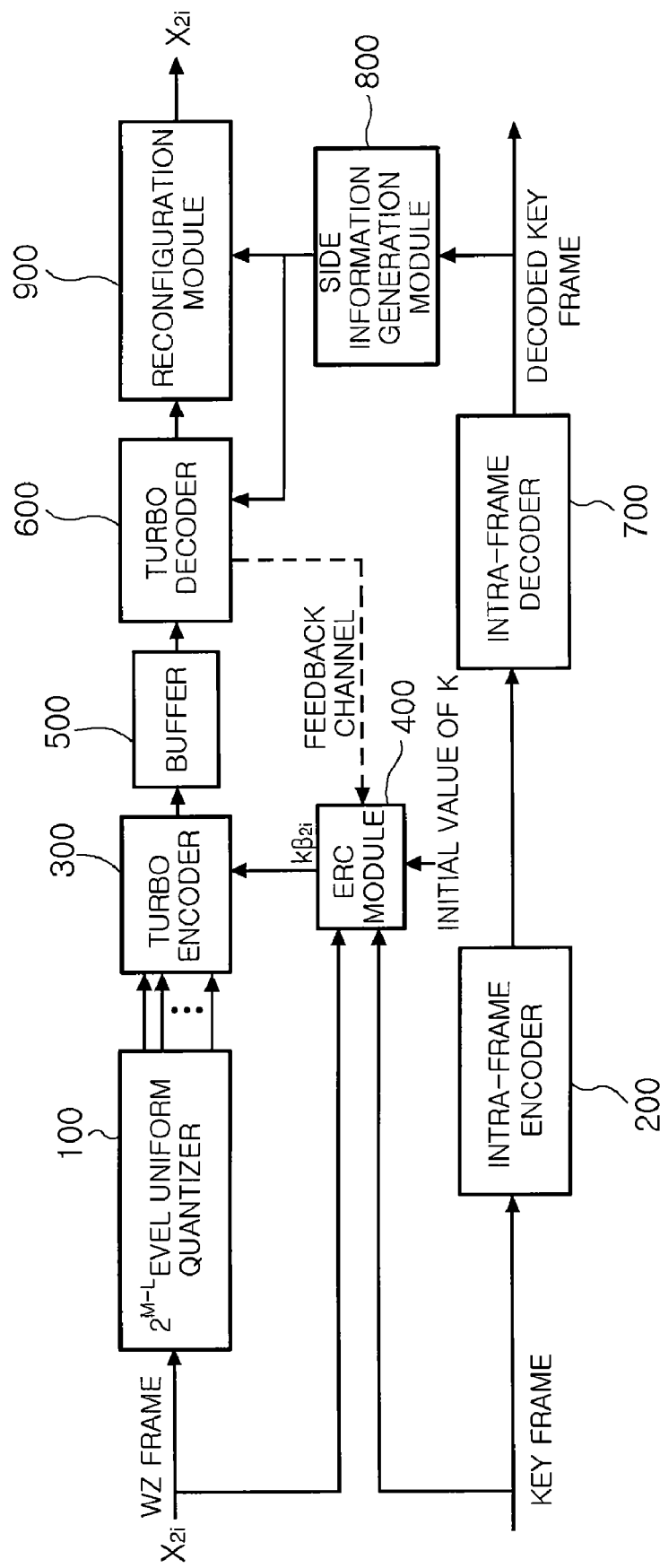
FIG. 2 is a configuration diagram illustrating a distributed video encoding apparatus having a function of controlling an encoding rate, according to an exemplary embodiment of the present invention.

FIG. 2 is a configuration diagram illustrating the DVC apparatus having a function of encoder rate control, according to an exemplary embodiment of the present invention.

Referring to FIG. 2, the DVC apparatus an intra-frame encoder 200 for encoding a key frame, a $2^{M\text{-}level}$ uniform quantizer 100 quantizing a WZ frame into uniform bit planes such as bitplane 1, . . . , and bitplane Mk, a turbo encoder 300 encoding the bit planes of the WZ frame, an encoder rate control (ERC) module 400 controlling an encoding rate of the turbo encoder 300, and a buffer 500 outputting an encoded frame as a bit stream. In this case, the turbo encoder 300 is based on Slepian-Wolf coder.

Also, the DVC apparatus further includes a turbo decoder 600 receiving and decoding the bit stream of the WZ frame encoded at the turbo encoder 300, an intra-frame decoder 700 decoding a bit stream of the encoded key frame, a side information generation module 800 generating side information using the key frame decoded at the intra-frame decoder 700, and a reconfiguration module 900 reconfiguring the side information and the decoded WZ frame.

In the DVC apparatus configured as described above, images that will be processed are divided into key frames and WZ frames. The key frames are compressed by the intra-frame encoder 200, and the WZ frames that are present between the key frames are compressed using the turbo encoder 300. The DVC apparatus includes the ERC module 400 for encoder rate control and removes a feedback channel of the turbo decoder 600 or reduce the number of feedbacks, thereby having low complexity.

In detail, the ERC module 400 calculates a difference between motions of a present WZ frame and a previous key frame to estimate motion complexity of a present WZ frame. For this, it is assumed that the ERC module 400 is capable of easily obtaining previous frames of present WZ frames.

That is, the ERC module 400 calculates motion complexity $\beta_{2i}$ with respect to all WZ frames $X_{2i}$ by using following Equation 2.

$$\beta_{2i} = \frac{1}{m \times n} \left( \sum_{k=1}^{m} \sum_{l=1}^{n} |I_{2i-1}(k, l) - X_{2i}(k, l)| \right) \quad \text{Equation (2)}$$

wherein m×n indicates a size of an image, $I_{2i}$ indicates a key frame, $X_{2i}$ indicates a WZ frame, and (k, 1) indicates pixel coordinates.

Also, the DVC apparatus uses a linear correlation between motion complexity of an image and a bit rate as shown in FIGS. 1A and 1B to maintain the encoder rate control of the turbo encoder 300. The linear correlation is shown in following Equation 3.

$$\alpha_{2i} = k\beta_{2i} \quad \text{Equation (3)}$$

wherein $\alpha_{2i}$ indicates a bit rate of a WZ frame $X_{2i}$, $\beta_{2i}$ indicates motion complexity calculated using a difference between motions of a present frame and a previous frame, and k indicates a constant.

That is, the ERC module 400 determines the number of parity bits of the turbo decoder 600 by controlling a value of the constant k multiplied by the motion complexity $\beta_{2i}$. An initial value of the constant k may be determined by using results of experiments. Also, a user may control the value of the constant k according to desired video quality and an ability of a system.

When feedback channels are not used, excluding the case in which the user changes k to adjust target quality, the same value of k may be used in all images.

In addition, when using feedback channels while a bit rate of a WZ bit stream outputted from the turbo encoder 300 is greater or smaller than a bit rate required in the turbo decoder 600, the turbo decoder 600 may be allowed to send a message for requesting the ERC module 400 of a new bit rate via a feedback channel. That is, the system may use the feedback channel to adjust the value of the constant k.

Accordingly, in the present embodiment, the ERC module simply controls the encoding rate by using the linear correlation between the motion complexity and the bit rate, thereby removing the feedback channel of the turbo decoder 600 or reducing the number of feedbacks.

Figure 3:
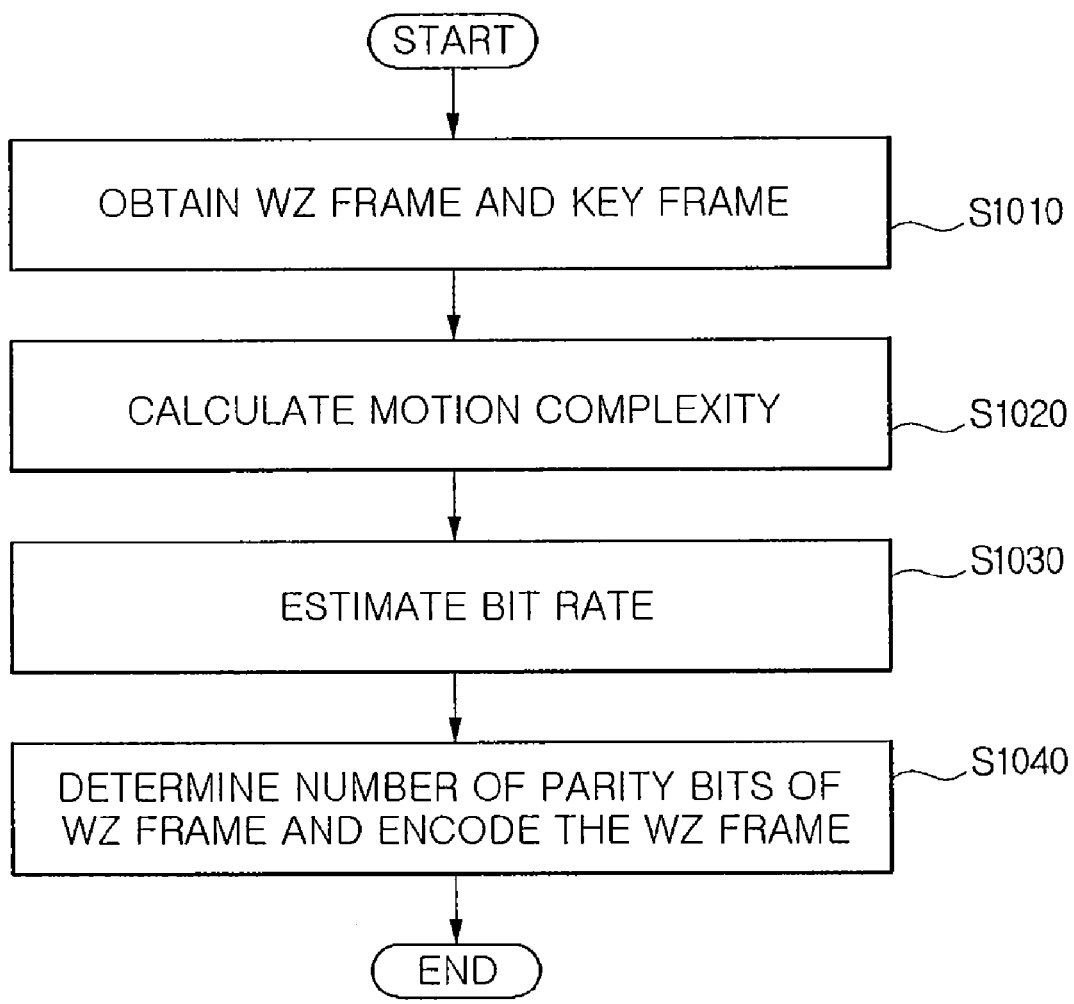
FIG. 3 is a flowchart illustrating a method of encoding a frame by controlling an encoding rate at the distributed video encoding apparatus of FIG. 2.

FIG. 3 is a flowchart illustrating a process of coding a frame by controlling an encoding rate at the DVC apparatus of FIG. 2.

Referring to FIG. 3, the ERC module 400 obtains a WZ frame and a key frame (S1010) and calculates motion complexity by using a difference between motions of the obtained WZ frame and key frame as shown in Equation 2 (S1020). According to a correlation between the motion complexity and the bit rate as shown in FIGS. 1A and 1B, a bit rate of a WZ bit stream is calculated from the motion complexity as shown in Equation 3 and estimated (S1030). The estimated bit rate of the WZ bit stream is transferred to the turbo encoder 300.

The turbo encoder 300 determines the number of parity bits according to the estimated bit rate of the WZ bit stream and encodes the WZ frame (S1040).

Also, in the present embodiment, the bit rate of the WZ bit stream may be controlled by changing the constant k according to target video quality as shown in Equation 3.

While the present invention has been shown and described in connection with the exemplary embodiments, it will be apparent to those skilled in the art that modifications and variations can be made without departing from the spirit and scope of the invention as defined by the appended claims.

What is claimed is:

1. A distributed video coding apparatus capable of controlling an encoding rate, the apparatus comprising:
an intra-frame encoder configured to encode a key frame and output a bit stream of the encoded key frame;
an encoder rate control (ERC) module configured to calculate a bit rate according to motion complexity of a present Wyner-Ziv (WZ) frame by using a correlation between the motion complexity and the bit rate; and
a turbo encoder configured to encode the present WZ frame by the bit rate calculated at the ERC module and output a WZ bit stream,
wherein the motion complexity of the present WZ frame is calculated as follows:

$$\beta_{2i} = \frac{1}{m \times n}\left(\sum_{k=1}^{m}\sum_{l=1}^{n}|I_{2i-1}(k,l) - X_{2i}(k,l)|\right)$$

wherein $\beta_{2i}$ indicates the motion complexity of the present WZ frame $X_{2i}$, m×n indicates a size of an image, $I_{2i-1}$ indicates a previous key frame, $X_{2i}$ indicates the present WZ frame, and (k, 1) indicates pixel coordinates.

2. The apparatus of claim 1, further comprising:
a uniform quantizer configured to uniformly quantize the present WZ frame and provide the uniformly quantized WZ frame to the turbo encoder; and
a buffer configured to store and output the WZ bit stream output from the turbo encoder, as a bit stream.

3. The apparatus of claim 1, wherein the turbo encoder is configured to determine the number of parity bits according to the bit rate calculated at the ERC module.

4. The apparatus of claim 1, wherein the ERC module is configured to obtain the motion complexity by using a difference between motion of the present WZ frame and the key frame and estimate the bit rate by multiplying the motion complexity by a constant k.

5. The apparatus of claim 4, wherein the constant k is set according to target video quality of a decoder.

6. A distributed video coding method capable of controlling an encoding rate, the method comprising:
obtaining a WZ frame and a key frame;
calculating motion complexity by using the WZ frame and the key frame;
estimating a bit rate of a WZ bit stream by using a linear correlation between the motion complexity and the bit rate; and
encoding the WZ frame according to the estimated bit rate of the WZ bit stream,
wherein the calculating motion complexity comprises obtaining the motion complexity by calculating a difference between motion of a present WZ frame and a previous key frame as follows:

$$\beta_{2i} = \frac{1}{m \times n}\left(\sum_{k=1}^{m}\sum_{l=1}^{n}|I_{2i-1}(k,l) - X_{2i}(k,l)|\right)$$

wherein $\beta_{2i}$ indicates motion complexity of the present WZ frame $X_{2i}$, m×n indicates a size of an image, $I_{2i-1}$ indicates the previous key frame, $X_{2i}$ indicates the present WZ frame, and (k, 1) indicates pixel coordinates.

7. The method of claim 6, wherein the estimating a bit rate comprises estimating the bit rate by multiplying the calculated motion complexity by a constant k.

8. The method of claim 7, further comprising adjusting quality of an image that will be decoded, by changing the constant k according to target video quality.

* * * * *